US 6,597,696 B1

(12) United States Patent
Toyama et al.

(10) Patent No.: US 6,597,696 B1
(45) Date of Patent: Jul. 22, 2003

(54) VARIABLE LENGTH PACKET SWITCH

(75) Inventors: Takaaki Toyama, Kanagawaken (JP);
Yusho Futami, Kanagawaken (JP);
Yasuo Murakami, Kanagawaken (JP);
Masahide Minowa, Kanagawaken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/373,594

(22) Filed: Aug. 13, 1999

(30) Foreign Application Priority Data

May 19, 1999 (JP) .......................................... 11-138162

(51) Int. Cl.[7] .................................................. H04J 3/24
(52) U.S. Cl. ................................... 370/395.31; 370/473
(58) Field of Search ............................... 370/474, 473, 370/395.31, 395.1, 395.64

(56) References Cited

U.S. PATENT DOCUMENTS

| | | | | |
|---|---|---|---|---|
| 5,568,477 A | * | 10/1996 | Galand et al. | 370/229 |
| 6,061,354 A | * | 5/2000 | Morikawa et al. | 370/389 |
| 6,275,494 B1 | * | 8/2001 | Endo et al. | 370/395.52 |
| 6,317,433 B1 | * | 11/2001 | Galand et al. | 370/395.2 |
| 6,330,242 B1 | * | 12/2001 | Ogawa et al. | 370/395.52 |
| 6,449,276 B1 | * | 9/2002 | Subbiah et al. | 370/395.1 |
| 6,483,838 B1 | * | 11/2002 | Ostman et al. | 370/395.31 |

* cited by examiner

*Primary Examiner*—Chau Nguyen
*Assistant Examiner*—Nhat Do
(74) *Attorney, Agent, or Firm*—Antonelli, Terry, Stout & Kraus, LLP

(57) ABSTRACT

In a variable length switch for exchanging CPS-packets by AAL2, an effective variable length packet switch without limiting capacitance of a switching section is provided when the CPS-packets are loaded on an ATM cell and exchanged. An interface section receives the ATM cell in which the CPS-packets are multiplexed and packed, disassembles the received ATM cell and demultiplexes and unpacks the CPS-packets loaded on the ATM cell. When output paths of the plurality of the CPS-packets are identical, the CPS-packets are transferred by multiplexing and packing them in the same connection. In an interface 110-1 to 110-N on a transmission side, a cell transferred from the switching section 100 is disassembled, and the CPS-packet are multiplexed and packed in a cell corresponding to an output path of the CPS-packets.

14 Claims, 14 Drawing Sheets

FIG. 7

| (H1,CID,UUI) | (H2,h) |
|---|---|
| (H1,CID,UUI)=(1,10,≠20) | (H2,h)=(1,1) |
| (H1,CID,UUI)=(1,10,20) | (H2,h)=(11,1) |
| ⋮ | ⋮ |
| (H1,CID,UUI)=(1,11,≠20) | (H2,h)=(1,2) |
| (H1,CID,UUI)=(1,11,20) | (H2,h)=(11,2) |
| ⋮ | ⋮ |

| (H2,h) | (H3,CID) |
|---|---|
| (H2,h)=(1,1) | (H3,CID)=(1,31) |
| (H2,h)=(1,2) | (H3,CID)=(1,32) |
| ⋮ | ⋮ |
| (H2,h)=(11,1) | (H3,CID)=(1,31) |
| (H2,h)=(11,2) | (H3,CID)=(1,32) |
| ⋮ | ⋮ |

VARIABLE LENGTH PACKET SWITCH

BACKGROUND OF THE INVENTION

The present invention relates to a variable length packet switch, more particularly to a variable length packet switch for exchanging variable length packets such as a Common Part Sublayer (CPS) packet which is defined as an Asynchronous Transfer Mode (ATM) Adaptation Layer type 2 (AAL type 2).

When a signal such as a voice signal which is a low speed signal and must be transmitted with a little delay, is transmitted through a packet network such as an ATM network, a transmission delay due to a time for constructing a packet is produced. In order to improve such delay, a cellularizing system called the AAL type 2 (AAL2) has been recommended as a International Telecommunication Union-Telecommunication Standardization Sector (ITU-T) recommendation I.363.2. This is a system for superposing a connection in an AAL2 level on a Virtual Channel (VC) connection in an ATM. In the AAL2, used is a variable length packet called a CPS-packet to which a connection identifier called a Channel Identifier (CID) is given. In the CPS-packet, a packet having a different CID is multiplexed and packed in a VC connection. Hereupon, it should be especially noted that a plurality of CPS-packets having different CIDs are multiplexed and packed on each other in a single ATM cell.

FIG. 14 illustrates a format of the CPS-packet. Referring to FIG. 14, a CPS-packet 1700 comprises a CID area 1701, an Length Indicator (LI) area 1702, a User-to-User Indication (UUI) CPS area 1703, a Header Error Control (HEC) area 1704, and a CPS Interface Data (CPS-INFO) area 1705. The CID area 1701 is the one on which the above described CID is loaded, and the LI area 1702 is the one in which a packet length of the CPS-packet is stored. Furthermore, in the UUI area 1703, a code called a user-to-user identifier is stored. The HEC area 1704 is the one for controlling an error of a packet header. The CPS-INFO area 1705 is a pay load of the CPS-packet and able to change its length. An ITU-T recommendation I.366.2 is made for a method to use the LI area 1702 and the UUI area 1703 in the foregoing ITU-T recommendation I.363.2, which is described in detail according to the method to use special packets and the CPS-INFO area 1705.

SUMMARY OF THE INVENTION

Hereupon, a method to constitute a switch in the AAL2 level is important. As was shown in the foregoing description for the prior art, CPS-packets having different CIDs are multiplexed and packed in a single cell. Accordingly, in order to output the CPS-packets multiplexed and packed in the single cell to different paths, it is necessary to decompose the ATM cell once. Moreover, after the received cell is decomposed, the CPS-packet is switched, and the cell is cellularized again, so as to transmit the cellularized, cell. Hereupon, in the case where the CPS-packet is switched, a method in which one CPS-packet is loaded on one ATM cell to allow it to pass through a switching section is conceived. However, the CPS-packet is a variable length packet, and if the CPS-packet is short in length, an ineffective area is produced in a payload of the ATM cell, so that a capacitance of the switching section is sometimes limited.

In order to solve the foregoing subjects, the object of the present invention is to provide a variable length switch which exchanges CPS-packets by AAL 2 effectively without limiting capacitance of a switching section when the CPS-packets loaded on an ATM cell are exchanged. The object of the present invention is to suppress a necessary bandwidth of the switching section not by performing switching after loading a single CPS-packet on a single ATM cell, but by multiplexing and packing a plurality of CPS-packets on the single ATM cell which are outputted to the same output path.

Furthermore, an interface section distinguishes special sorts of CPS-packets from others, and allows them to travel on a different connection and to pass through the switching section, thus enabling to control a transfer quality such as a loss rate in accordance depending on characteristics of the CPS-packets. This implies that a quality control of the special CPS-packets in the switching section is enabled when a plurality of CPS-packets are multiplexed and packed in a single ATM cell and allowed to pass through the switching section.

According to the present invention, a variable length packet switch is provided, which exchanges a plurality of variable length packets loaded on a cell to be transferred in an asynchronous transfer mode, comprising:

a receiving interface section for receiving a cell;

a transmission interface section for transmitting the cell; and a switching section for exchanging the cell, the switching section to which the receiving and transmitting interface sections are connected, wherein the receiving interface section includes a variable length packet receiving section which disassembles the received cell to demultiplex and unpack the variable length packets multiplexed and packed in the received cell and multiplexes and packs the variable length packets in a cell having the same header value, the variable length packets being transferred to the same transfer interface section where a transmission processing is performed, thereby allowing the variable length packets to pass through the switching section, the switching section transfers the cell transferred from the receiving interface section to the transmission interface section where a transmission processing is performed in accordance with a header value of the cell, and the transmission interface section includes a variable length packet transmission section which disassembles the cell transferred from the switching section, demultiplexes and unpacks the variable length packets multiplexed and packed, and multiplexes and packs the variable length packets to be outputted in the same output path in a transmission cell having the same header value.

In the variable length packet switch of the present invention, the receiving interface section further identifies a sort of the variable length packet having the same transmission interface section where a transmission processing is performed, and multiplexes and packs the variable length packet in a cell having a different header value depending on the sort thereof thereby transferring the cell to the switching section.

In the variable length packet switch of the present invention, an upper layer function section connected to the switching section is further provided, wherein the receiving interface section disassembles a received cell, demultiplexes and unpacks the variable length packet multiplexed and packed in the received cell, and multiplexes and packs the variable length packets, which are to be subjected to a transmission processing by the same upper layer functioning section, in a cell of the same header value, thereby transferring the cell to the upper layer functioning section.

BRIEF DESCRIPTION OF THE DRAWINGS

For a more complete understanding of the present invention and the advantages thereof, reference is now made to the following description taken in conjunction with the accompanying drawings, in which;

FIG. 7 is an explanatory view of an ATM cell header conversion table 1251 used in the ATM cell transmission section 312 and a CPS-packet header conversion table 1351 used in the CPS-packet transmission section 313;

FIG. 11 is an explanatory view of a CPS-packet header conversion table 1401 used in the CPS-packet receiving section 213;

FIG. 12 is an explanatory view of a CPS-packet header conversion table 1451 used in the CPS-packet transmission section 313;

DETAILED DESCRIPTION OF THE PREFERRED EMBODIMENTS

Figure 1:
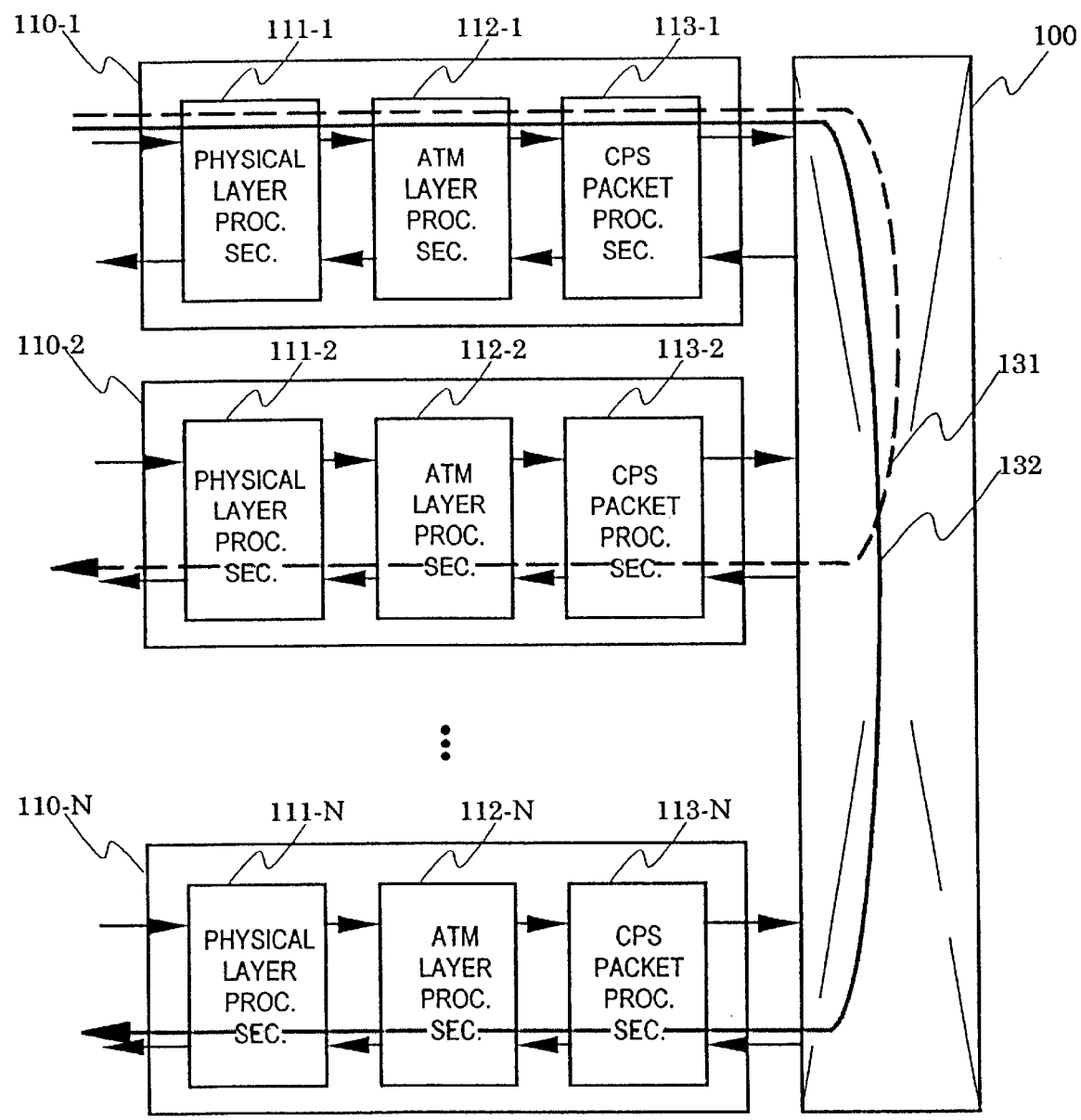
FIG. 1 is a block diagram of a first embodiment of a variable length packet switch according to the present invention.

FIG. 1 is a block diagram of a first embodiment of a variable length packet switch according to the present invention. Particularly, FIG. 1 shows a constitution of the switch for exchanging a CPS-packet. In FIG. 1, a switching section 100 and a plurality of interface sections 110-1 to 110-N are provided. In the following description, a CPS-packet will be described as the variable length packet. However the present invention is not limited to this, and the present invention can be applied to a proper variable length packet.

The switching section 100 is a switch for exchanging an ATM cell and determines an output path of the cell by referring to a specified area in the header of the ATM cell. Each of the interface sections 110-1 to 110-N comprises a physical layer processing section 111-1 to 111-N, an ATM layer processing section 112-1 to 112-N and a CPS-packet processing section 113-1 to 113-N.

The physical layer processing section 111-1 receives a signal supplied from a transmission path, and separates the ATM cell from a frame of the transmission path to transmit it to the ATM layer processing section 112-1 to 112-N. On the contrary the physical layer processing section 111-1 loads the ATM cell transferred from the ATM layer processing section 112-1 to 112-N and outputs the ATM cell. To be more specific, the ATM layer processing section 112-1 to 112-N analyzes a Virtual Pass Identifier/Viral Channel Identifier (VPI/VCI) loaded on the header of the ATM cell and extracted by the physical layer processing section 111-1 to 111-N, and converts it into a header of the ATM cell within the device to transfer it to the CPS-packet processing section 113-1 to 113-N. Moreover, the ATM layer processing section 112-1 to 112-N obtains the VPI/VCI on the transmission path by the ATM cell header from the CPS-packet processing section 113-1 to 113-N, and loads the VPI/VCI on a predetermined area of the ATM cell to output it to the transmission path via the physical processing section 111-1 to 111-N.

The CPS-packet processing section 113-1 to 113-N disassembles the ATM cell processed in the ATM layer processing section 112-1 to 112-N, and extracts CPS-packets multiplexed and packed in the ATM cell, thus deciding an interface section 110-1 to 110-N that is an output path for the packets by the CID loaded on the header portion of the CPS-packet and the cell header in the device, which is given by the ATM layer processing section 112-1 to 112-N. At this time, with respect to the CPS-packets to be outputted on the same output path, the CIDs of the CPS-packet header on the transmission path are converted to the CIDs of the packet header within the device, and thereafter they are multiplexed and packed in a single ATM cell and sent out to the switching section 100. On the contrary, with respect to the ATM cell transferred from the interface section 110-1 to 110-N via the switching section 100, the cell is disassembled and a plurality of CPS-packets are extracted loaded therein. The CID of the packet header within the device is converted to the CID of the CPS-packet header on the transmission header. The extracted packets are multiplexed and packed on the ATM cell again, and transferred to the ATM layer processing section 112-1 to 112-N.

In FIG. 1, the paths 131 and 132 show an example of the transfer path of the CPS-packets within the device.

In the physical layer processing section 111-1, the ATM cell inputted to the interface section 111-1 is extracted from the frame of the physical layer, and analysis/conversion for VPI/VCI is performed in the ATM layer processing section 112-1. Furthermore, in the CPS-packet processing section 113-1, the ATM cell is disassembled, and the CPS-packets are extracted. The extracted CPS-packets are multiplexed and packed in the VC connection within the device, which is set for each of the interface sections 110-1 to 110-N to which CID is given, the interface sections 110-1 to 110-N serving as an output path. The extracted CPS-packets are transferred to the switching section 100. It should be noted that the VC connection identified by the cell header within the device shall be referred to as a VC connection within a device (an internal VC connection).

FIG. 1 shows an example in which the path 131 transfers the CPS-packets between the interface sections 110-1 and 110-2 and the path 132 transfers the CPS-packets between the interface sections 110-1 and 110-N. With respect to the path 131, the CPS-packet processing section 113-1 multiplexes and packs the separated CPS-packet in the VC connection within the device which leads to the interface section 110-2 as an output path and outputs it. With respect to the path 132, the CPS-packet processing section 113-1 multiplexes and packs the separated CPS-packet in another VC connection within the device which leads to the interface 110-N as an output path and outputs it. The switching section 100 transfers the ATM cells from the interface section 110-1 to the interface sections 110-2 and 110-N, respectively. Since the processing in each of the interface sections 110-2 and 110-N is identical, the description for the processing in the interface section 110-2 will be described. In the CPS-packet processing section 113-2, the ATM cell transferred from the switching section 100 is disassembled, and the CPS-packet is extracted. The CID within the device is analyzed from the CPS-packet header, and the analyzed CID is converted to the CID on the transfer path. Moreover, at this time, the VC connection within the device, in which the CPS-packet is multiplexed and packed, is decided, and the CPS-packet is multiplexed and packed in a corresponding VC connection. The ATM cell generated in the CPS-packet processing section 113-2 is presented with VPI/VCI on the transfer path in the ATM layer processing section 112-2. In the physical layer processing section 111-2, the physical layer process is executed, and loaded on the frame on the transmission path and outputted to the transmission path. In the above described manner, the CPS-packet inputted from each of the interface sections 110-1 to 110-N is exchanged, and outputted from each of the interface sections 101-1 and 101-N serving as the output path.

Figure 2:
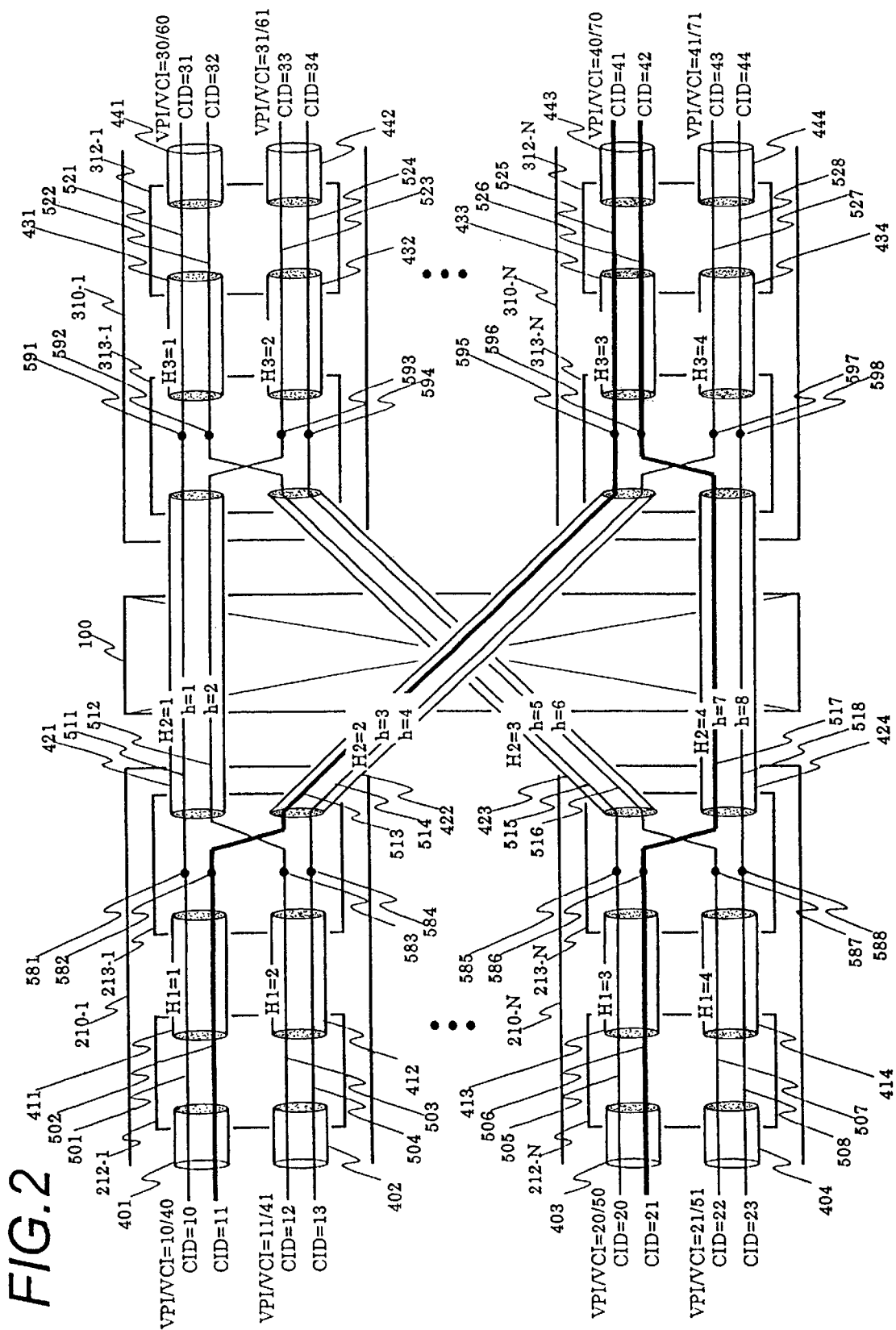
FIG. 2 is a view showing a first example of a connection setting state in a device in the first embodiment.

Next, descriptions how to deal with the header and connection within the foregoing device will be made. FIG. 2 shows a first example of a setting state of the connection within the device in a first embodiment. As a correspondence of FIG. 1 with FIG. 2, with regard to the interface sections 110-1 to 110-N, input sides 210-1 to 210-N and output sides 310-1 to 310-N are illustrated. Moreover, with regard to the ATM layer processing sections 112-1 to 112-N, cell receiving sections 212-1 to 212-N and cell transmission sections 312-1 to 312-N are illustrated. Similarly, with regard to the CPS-packet processing sections 113-1 to 113-N, CPS-packet receiving sections 213-1 to 213-N and CPS-packet transmission sections 313-1 to 313-N are illustrated.

FIGS. 2 shows an example in which four AAL2 level connections 501, 502, 503 and 504 expressed by combinations of (VPI, VCI, CID)=(10, 40, 10), (10,40,11), (11, 41, 12), (11, 41, 13) are set for the input side 210-1 in the interface section. Hereinafter, the AAL2 level connection shall be simply referred to as a connection. Similarly, connections 505, 506, 507, and 508 designated by (VPI, VCI, CID)=(20, 50, 20), (20, 50, 21), (21, 51, 22), (21, 51, 23) are set for the input side 210-N in the interface section. Furthermore, four connections 521, 522, 523, and 524 designated by (VPI, VCI, CID)=(30, 60, 31), (30, 60, 32), (31, 61, 33), (31, 61, 34) are set for the output side 310-1 in the interface section, and four connections 525, 526, 527, and 528 designated by (VPI, VCI, CID)=(40, 70, 41), (40, 70, 42), (41, 71, 43), (41, 71, 44) are set for the output side 310-N in the interface section. In the above example, the constitution in which the four connections are respectively set for the input sides 210-1 and 210-N in the interface section and the output sides 310-1 and 310-N in the interface section is described. The combination of the number of the connections with (VPI, VCI, CID) may be variable arbitrarily within a range limited by such as tables from viewpoint of hardware.

Descriptions for the transfer of the CPS-packet within the device will be hereinafter described using the foregoing examples. In order to show a typified transfer within the device, an example is shown in which the connection 502 designated by (VPI, VCI, CID)=(10, 40, 11), which is set on the input side 210-1 in the interface section, is exchanged with the connection 506 designated by (VPI, VCI, CID)= (20, 50, 21), which is set on the input side 210-N in the interface section, and the connection 502 is outputted to the connection 525 designated by (VPI, VCI, CID)=(40, 70, 41), which is set on the output side 310-N in the interface section and the connection 506 is outputted to the connection 526 designated by (VPI, VCI, CID)=(40, 70, 42), which is set on the output side 310-N in the interface section.

In the ATM cell receiving section 212-1, the connection 501 is subjected to an ATM cell header analysis, and H1=1 is retrieved from (VPI, VCI)=(10, 40). Hence, the header of the ATM cell is changed. This implies that the VC connection 401 designated by (VPI, VCI)=(10, 40) has been converted to the VC connection 411 within the device designated by H1=1. H1 is a value which is loaded on the ATM cell header transferred within the device. Values to be loaded on the ATM cell header within the device shall be hereinafter expressed by H1, H2, . . . , and the VC connection within the device shall be designated by these values. Furthermore, CID which is presented to the CPS-packet header transferred within the device shall be expressed by h, h1, h2, and the connection within the device (the internal connection) shall be designated by these values similarly to the case of the VC connection within the device. After the foregoing conversion of the ATM cell header, the connection 502 is designated by (H1, CID)=(1, 11) in the CPS-packet receiving section 213-1. In the CPS-packet receiving section 213-1, (H2, h)=(2, 3) designating the connection 513 within the device in the switching section 100 is retrieved, and in the CPS-packet header conversion point 582, the value of CID of the CPS-packet header is converted to h=3. Specifically, this implies that the connection 502 designated by (H1, CID)=(1, 11) was converted to the connection 513 within the device, which is designated by (H2, h)=(2, 3). Furthermore, the CPS-packet having being subjected to the header conversion is multiplexed and packed on the VC connection 422 within the device, which is designated by H2=2, and transferred to the switching section 100.

Similarly, with regard to the connection 506, conversion of the ATM cell header is performed by the cell receiving section 212-N. In the CPS-packet receiving section 213-N, (H2, h)=(4, 7) is retrieved from the converted ATM cell header and the value (H1, CID)=(3, 21) of the CPS-packet header, and CID of the CPS-packet header is converted to h=7. Furthermore, the CPS-packet header is multiplexed and packed in the VC connection 424 within the device designated by H2=4, and then transferred to the switching section 100. The switching section 100 connects the VC connections 422 and 424 within the device, which are designated by H2=2 and H2=4, to the output side 310-N of the interface section serving as an output path.

In the CPS-packet transmission section 313-N on the output side 310-N of the interface section, the ATM cell is disassembled, which corresponds to the VC connections 422 and 424 within the device, which are designated by H2=2 and H2=4, and then the CPS-packet is extracted. Moreover, the CPS-packet header is changed, which corresponds to the connections 513 and 517 designated by (H2, h)=(2, 3) and (4, 7) in the CPS-packet header conversion points 595 and 596. In the CPS-packet header conversion point 595, (H3, CID)=(3, 41) is retrieved from (H2, h)=(2, 3), and the CPS-packet header is converted to CID=41. In the CPS-packet header conversion point 596, (H3, CID)=(3, 42) is retrieved from (H2, h)=(4, 7), and the CPS-packet header is set to CID=42. Thereafter, both of the connections 525 and 526 are multiplexed and packed in the VC connection 433 within the device, which is designated by H3=3, and then transferred to the ATM cell transmission section 312-N. In the ATM cell transmission section 312-N, (VCI, VP)=(40, 70) is retrieved from the ATM cell header H3=3 of the VC connection 433 within the device, and outputted after presenting the ATM cell header thereto.

In such manner described above, the connection 502 designated by (VPI, VCI, CI)=(10, 40, 11) and the connection 506 designated by (VPI, VCI, Cl)=(20, 50, 21) are exchanged with each other, and they are outputted as the connection 525 designated by (VPI, VCI, Cl)=(40, 70, 41) and the connection 526 designated by (VPI, VCI, Cl)=(40, 70,42).

Figure 3:
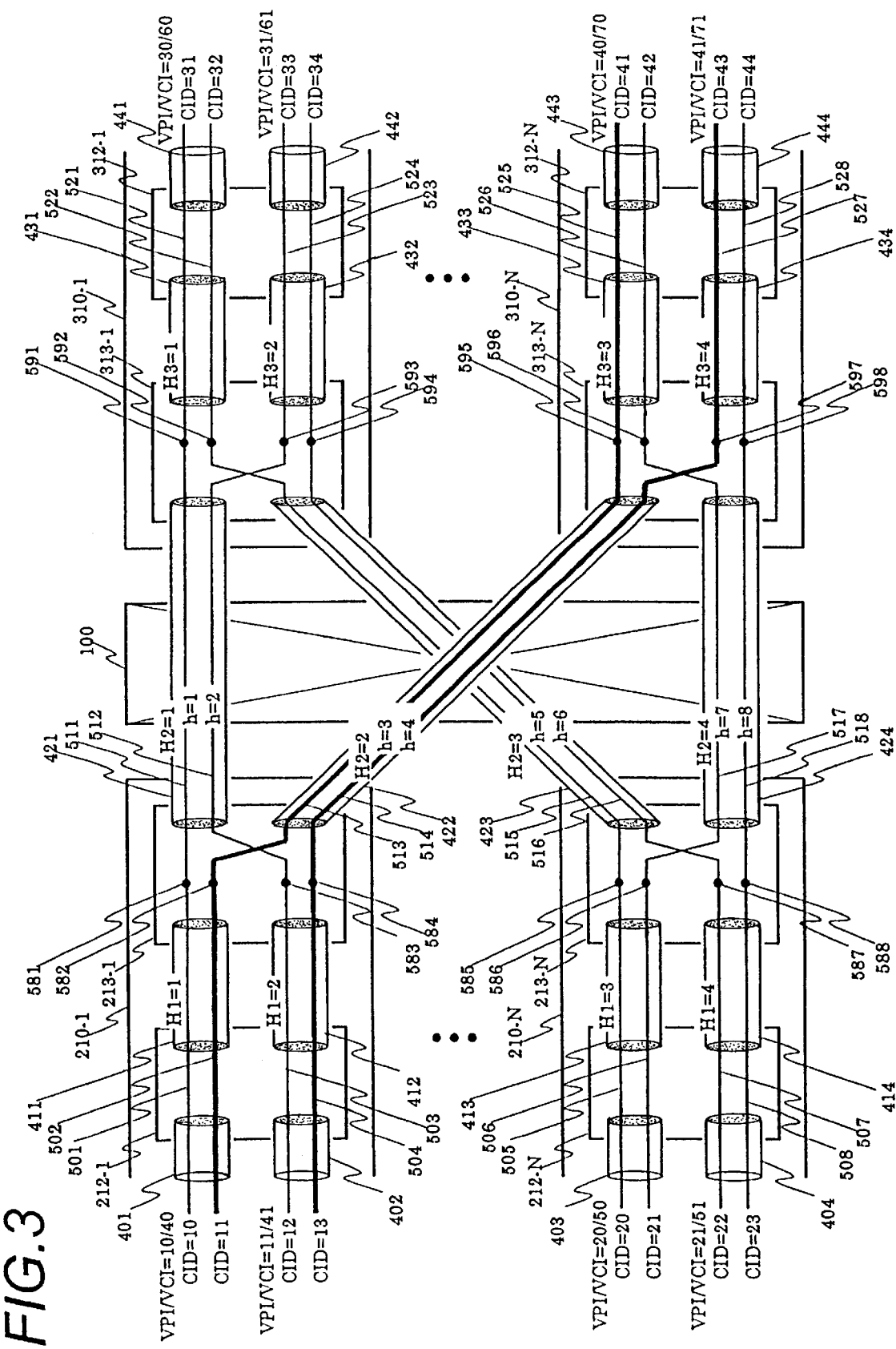
FIG. 3 is a view showing a second example of a connection setting state in a device in the first embodiment.

Next, FIG. 3 shows a second example of a setting state of the connections within the device in the first embodiment. An example in which a plurality of connections within the device are multiplexed and packed in the VC connection within the device, which is connected to the switching section 100, will be hereinafter described. In this example, considerations will be made for the connections 502 and 504 which are set on the input side 210-1 of the interface and 504 and designated by (VPI, VCI, CID)=(10, 40, 11) and (11, 41, 13).

In the similar manner described above, the VC connection including 401 including the connection 502 is subjected to a header conversion of the ATM cell by the ATM cell receiving section 212-1, and transferred as the VC connection within the device, which is designated by H1=1. Thus, in the CPS-packet receiving section 213-1, the connection 502 is identified as (H1, CID)=(1, 11). With regard to the connection 504, in the similar manner to that for the connection 502, the connection 504 is designated by (H1, CID)=(2, 3) in the CPS-packet receiving section 213-1. With regard to the connection 502 designated by (H1, CID)=(1, 11), the value of (H2, h)=(2, 3) which designates the connection 513 within the device is retrieved from the value of (H1, CID)=(1, 11) in the CPS-packet header conversion point 582, and the CID value of the CPS-packet header is converted to h=3 in the CPS-packet header conversion point 582. Similarly, in the CPS-packet header conversion point 584, the connection 504 designated by (H1, CID)=(2, 13) is changed to the connection 514 within the device, which is designated by (H2, h)=(2, 4). Furthermore, the connections 513 and 514 within the device are multiplexed and packed in the VC connection 422 within the device and transferred to the switching section 100.

In the output side 310-N of the interface to be connected to the connections 513 and 514 within the device, the similar processings to that described above are executed. Finally, the connection 513 within the device is connected to the connection 525 designated by (VPI, VCI, CID)=(40, 70, 41) and the connection 514 within the device is connected to the connection 527 designated by (VPI, VCI, CID))=(41, 71, 43).

Hereupon, paying attention to the VC connection 422 within the device, it is emphasized that the connection 514 within the device as well as the connection 513 within the device is multiplexed and packed in the VC connection 422 within the device. This means that a plurality of CPS-packets are multiplexed and packed in a payload of the ATM cell to be exchanged by the switching section 100. Thus, a payload area of the ATM cell is effectively utilized. Accordingly, capacity of the switching section 100 can be effectively used.

Now, for example, transfer by AAL2 of a compressed voice is considered as follows. Hereupon, as a method recited in ITU-T recommendation I.366.1 that is the foregoing prior art, there has been a method in which a voice signal of 64 kbit/s is compressed to a compressed voice signal of 8 kbit/s and transferred. Specifically, it is possible to loads two or more CPS-packets in the payload area of the ATM cell. For example, when the two CPS-packets are loaded on the payload area, the number of the ATM cells passing through the switching section 100 reduces to half compared to the case where one CPS-packet is loaded on one cell.

However, in the case where one connection within the device is multiplexed and packed in the VC connection within the device in the above described manner, a delay of the CPS-packet sometimes doubles due to a waiting time when the CPS-packet is loaded on the ATM cell. In order to avoid this, multiplexing and packing of a plurality of connections within the device in one VC connection within the device is made to be possible. If it is made to be possible to multiplex and pack N connections within the device in one VC connection within the device, a delay amount will be 1/N on the average. Hereupon, when considerations for the connections 513 and 514 within the device are made, the delay amount will be ½ on the average, compared to the case where one connection within the device is multiplexed and packed in one VC connection within the device. Specifically, it will be possible to reduce the number of the ATM cells passing through the switching section 100 to half without increasing the delay amount relative to the connections 513 and 514 within the device by the VC connection 422 within the device.

Figure 4:
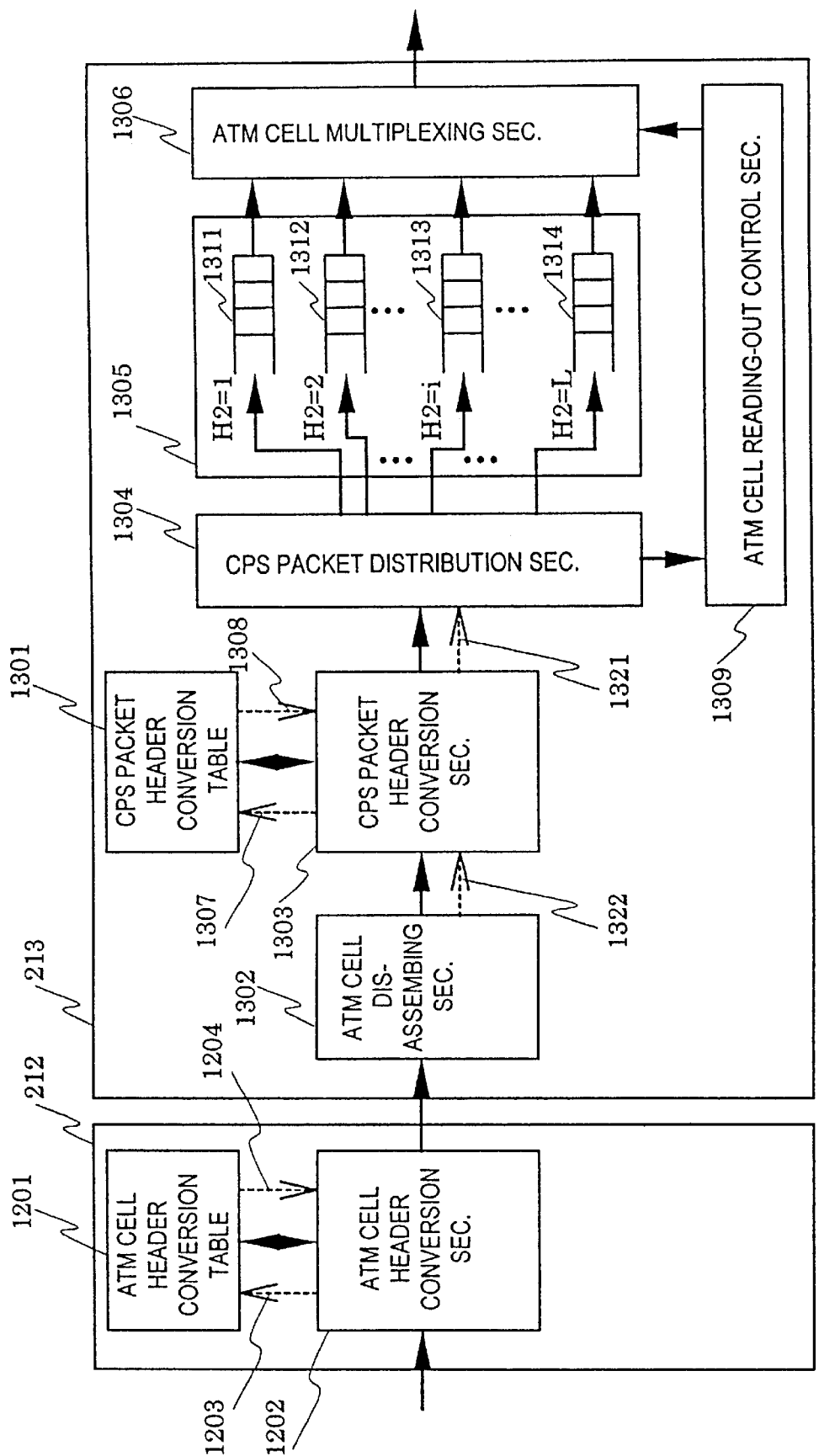
FIG. 4 is a block diagram of an ATM cell receiving section 212 and a CPS-packet receiving section 213.
Figure 5:
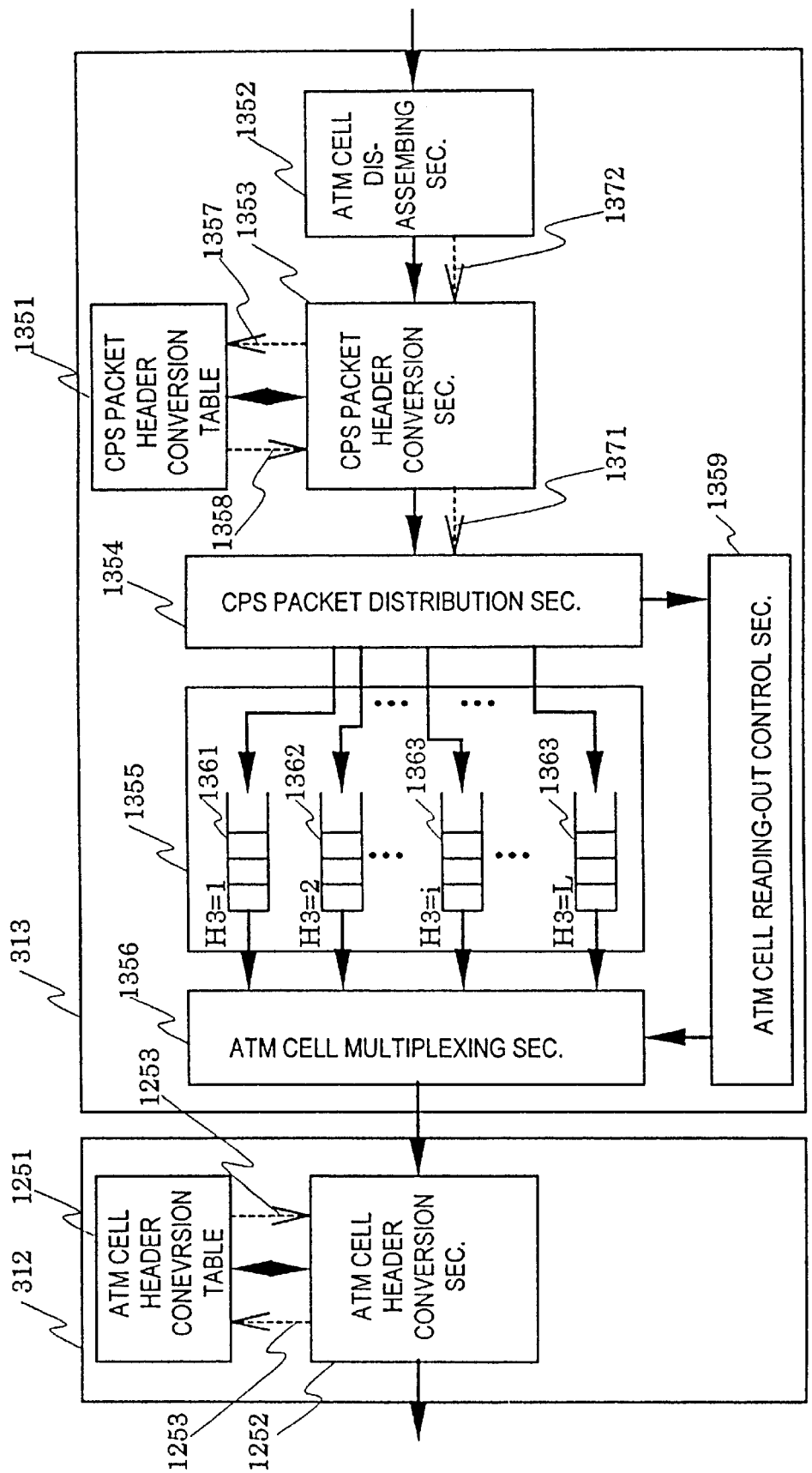
FIG. 5 is a block diagram of an ATM cell transmission section 312 and a CPS-packet transmission section 313.
Figure 6:
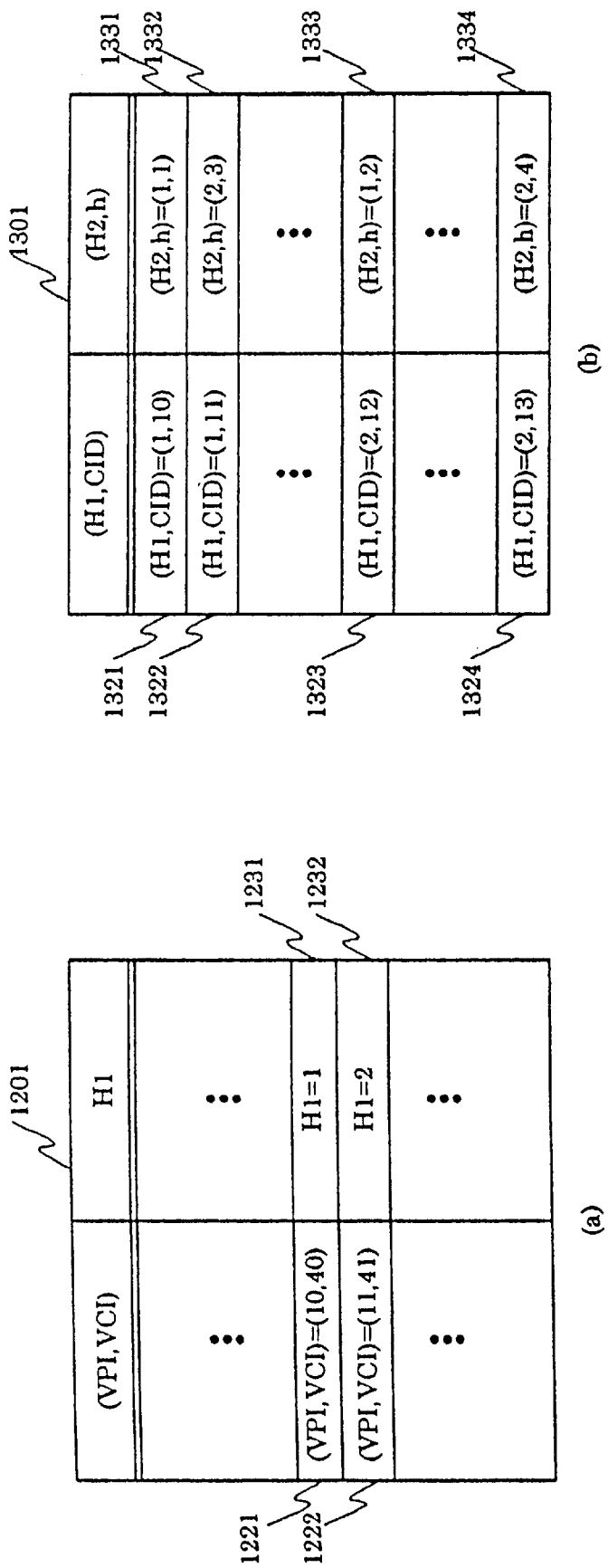
FIG. 6 is an explanatory view of an ATM cell header conversion table 1201 used in the ATM cell receiving section 212 and a CPS-packet header conversion table 1301 used in the CPS-packet receiving section 213.
Figure 7:
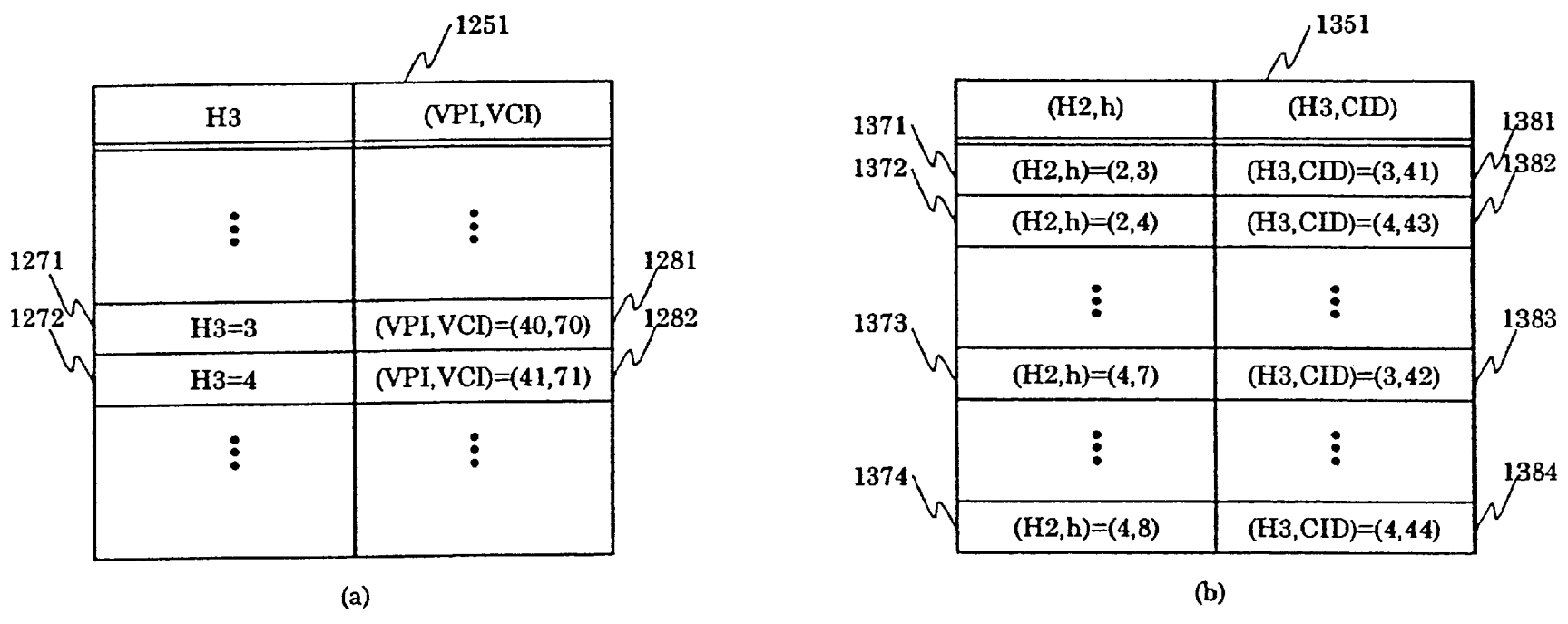

Next, processings for the ATM cell and the CPS-packet will be described. FIG. 4 shows a block diagram showing the ATM cell receiving section 212 and the CPS-packet receiving section 213. FIG. 5 shows a block diagram showing the ATM cell transmission section 312 and the CPS-packet transmission section 313. Furthermore, FIGS. 6(a) and 6(b) show explanatory views of an ATM cell header conversion table 1201 used in the ATM cell receiving section 212 and a CPS-packet header conversion table 1301 used in the CPS-packet receiving section 213. FIGS. 7(a) and 7(b) show explanatory views of an ATM cell header conversion table 1251 used in the ATM cell transmission section 312 and a CPS-packet header conversion table 1351 used in the CPS-packet transmission section 313. Hereupon, FIGS. 6(a) and 6(b) showing the ATM cell header conversion table 1201 and the CPS-packet header conversion table 1301 exemplify a setting state of a table on the receiving side 210-1 of the interface section, when the connections are set as shown in FIGS. 2 and 3. Similarly, FIGS. 7(a) and 7(b) show setting states of the ATM cell header conversion table 1251 and the CPS-packet header conversion table 1351 on the transmission side 310-N of the interface.

A behavior of a signal flowing from the transmission path to the switching section 100 will be first described. The ATM cell receiving section 212 comprises the ATM cell header conversion section 1202 and the ATM cell header conversion table 1201. In the ATM cell header conversion section 1202, VPI/VCI is extracted from an ATM cell header inputted, and the ATM cell header conversion table 1202 is accessed. Then, a header value to be loaded on the ATM cell within the device is retrieved. After the ATM cell header conversion table 1201 registers the VPI/VCI value loaded on the ATM cell, which is on the transmission path, the ATM cell header conversion table 1201 stores while allowing the VPI/VCI value to correspond to H1 for loading the header value within the device after header conversion. The ATM header conversion section 1202 retrieves the ATM cell header conversion table 1201 using (VPI, VCI) extracted from the ATM cell header as a retrieval key, and obtains the header H1 within the device, thus performing the ATM cell header conversion. With regard to the VC connection designated by, for example, (VPI, VCI)=(10, 40), the area 1221 designated by (VPI, VCI)=(10, 40) of the ATM cell header conversion table 1201 is retrieved, and a header conversion is performed using H1=1, which is registered in the area 1231 corresponding to the area 1221, as a header within the device. The header conversion table may be simply constituted by a memory and a retrieve theory, or alternatively may use a memory exhibiting a retrieve function called a Content Address Memory (CAM).

The CPS-packet receiving section 213 comprises the CPS-packet header conversion table 1301, an ATM cell disassembling section 1302, a CPS-packet header conversion section 1303, a CPS-packet distribution section 1304, a cell assembling buffer 1305, an ATM cell multiplexing section 1306 and an ATM cell reading-out control section 1309.

The ATM cell disassembling section 1302 disassembles the ATM cell, and demultiplexes and unpacks the CPS-packet loaded therein, thus transferring the CPS-packet to the CPS-packet header conversion section 1303. At this time, besides the CPS-packet, the ATM cell disassembling section 1302 transfers the header value H1 within the device, which is loaded on the ATM cell header before disassembled, to the CPS-packet header conversion section 1303 via a transfer path 1322. The CPS-packet header conversion section 1303 accesses the CPS-packet header conversion table 1301, thus obtaining the CPS-packet header value loaded on the CPS-packet within the device and the ATM cell header value of the VC connection within the device, in which the CPS-packet is multiplexed and packed.

After the CPS-packet header conversion table 1301 registers the ATM cell header value H1 within the device and the CID value of the CPS-packet (H1, CID), the CPS-packet header conversion table 1301 registers the ATM cell header value H2 within the device and the CPS-packet header value h, both of which have been subjected to the conversion, and stores them therein while allowing them to correspond to each other. The CPS-packet header conversion section 1303 accesses the CPS-packet header conversion table using (H1, CID) as a retrieval key in the manner similar to that of the ATM cell header conversion section 1202, and obtains (H2, h). The CPS-packet header conversion section 1303 converts the CPS-packet header to h, and transfers it to the CPS-packet distribution section 1304. At this time, the CPS-packet header conversion section 1303 transfer the H2 value to the CPS-packet distribution section 1304 via the transfer path 1321. The CPS-packet distribution section 1304 decides the VC connection within the device, which multiplexes and packs the CPS-packet, by H2 value, and transfers the CPS-packet to the ATM cell assembling buffer 1305. In the ATM cell assembling buffer 1305, the CPS-packets to be sequentially stored are multiplexed and packed in the buffers 1311 to 1314, thus assembling the ATM cell. In the ATM cell multiplexing section 1306, the ATM cell assembled in the buffers 1311 to 1314 is multiplexed, and transferred to the switching section 100.

Figure 15:
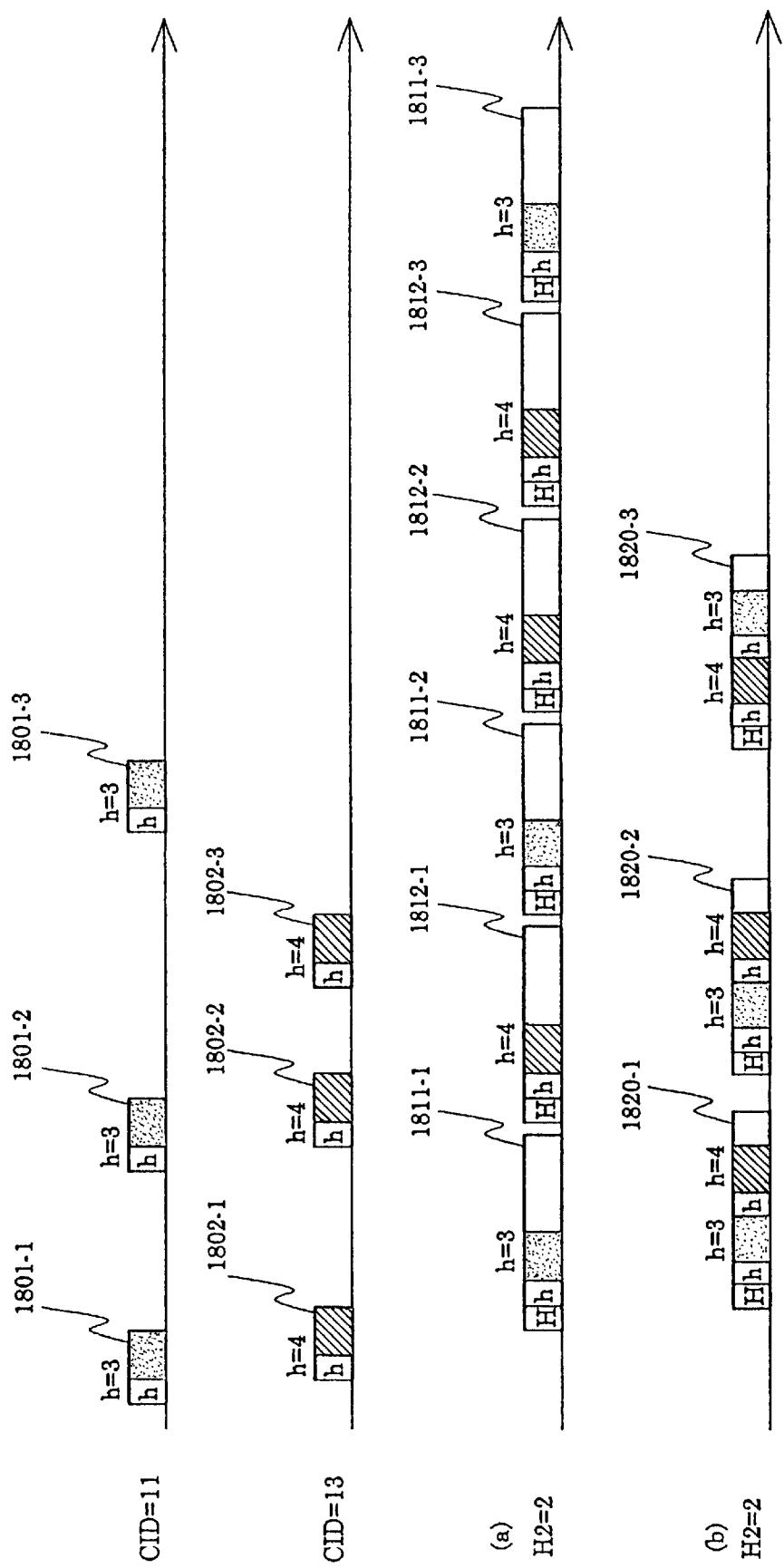
FIG. 15 is a view showing a cell assembling method in an ATM cell assembling buffer.

FIG. 15 shows an assembling method by the ATM cell assembling buffer 1305. In FIG. 15, the CPS-packets 1801-1 to 1801-3 show the CPS-packets which are multiplexed and packed in the connection 502 in FIGS. 2 and 3, and the CPS-packets 1802-1 to 1802-3 show the CPS-packets which are multiplexed and packed in the connection 504. Moreover, FIG. 15(*a*) corresponds to the example of FIG. 2, and shows the ATM cell on the VC connection 422 within the device, at the time when the ATM cells 1811-1 to 1811-3 and 1812-1 to 1812-3 respectively load one CPS-packet. Similarly, FIG. 15(*b*) corresponds to the example of FIG. 3, and shows the ATM cell on the VC connection 422 within the device at the time when the ATM cells 1820-1 to 1820-3 respectively load two CPS-packets. As shown in FIG. 15, when the two CPS-packets are loaded on one ATM cell, an empty area of the ATM cell payload is smaller than that in the case where one CPS-packet is loaded on one ATM cell. As described above, the necessary bandwidth of the switching section 100 can be lessened by allowing one ATM cell, which multiplexes and packs the plurality of CPS-packets, to pass through the switching section 100.

At this time, reading-out of the ATM cell from the ATM cell multiplexing section 1306 Is controlled by the ATM cell reading-out control section 1309. ATM cell reading-out control section 1309 designates queues 1311 to 1314 for reading out the ATM cell according to predetermined algorithm, and controls the ATM cell multiplexing section 1306, whereby the ATM cell reading-out control section 1309 controls the reading-out of the ATM cell to be transferred to the switching section 100. Hereupon, the predetermined algorithm includes, for example, a static scheduler, a queue monitor by a threshold, a timer monitor by queue unit, a queue monitor by quality of service (QoS), or the like. The static scheduler is a control to sequentially read out the ATM cell from queues 1311 to 1314 according to a predetermined order. The queue monitor by the threshold is a control system in which the quantity of the CPS-packets stored in the queues 1311 to 1314 is always monitored, and the CPS-packets are outputted as the ATM cell when the quantity thereof exceeds a predetermined value. For example, a method in which the ATM cell is outputted at the time when a half of the payload of the ATM cell is filled corresponds to the queue monitor by the threshold. In this case, the number of the CPS-packets which fill the half of the payload of the ATM cell is equivalent to the threshold. Furthermore, the timer monitor by the queue unit is a method in which a period of time in which the CPS-packets stay in the queues 1311 to 1314 is monitored, the ATM cell is instantaneously outputted when the ATM cell is filled within a predetermined period of time, and the ATM cell is forcibly assembled after passage of the predetermined period of time and outputted. The queue monitor by the quality of service is a method in which the ATM cell is outputted, for example, in accordance with the quality of service. In any method, when the ATM cell is not filled with the CPS-packet, the ATM cell can be filled by inserting dummy data. The foregoing algorithm is determined by a delay in the switching section 100 and a needed condition for a usage efficiency of the switching section 100.

Next, a flow of a signal in the direction from the switching section 100 to the transfer path will be described. The CPS-packet receiving section 313 comprises the CPS-packet header conversion table 1351, the ATM cell disassembling section 1352, the CPS-packet header conversion section 1353, the CPS-packet distribution section 1354, the cell assembling buffer 1355, the ATM cell multiplexing section 1356 and the ATM cell reading-out control section 1309.

The ATM cell disassembling section 1352 disassembles the ATM cell transferred from the switching section 100, extracts the CPS-packet, and transfers the CPS-packet to the CPS-packet header conversion section 1353. At this time, the ATM cell header value H2 within the device is also transferred to the CPS-packet header conversion section 1353 via the transfer path 1372. The CPS-packet header conversion section 1353 accesses the CPS-packet header conversion table 1351, and obtains the CPS-packet header value loaded on the CPS-packet on the transfer path and the ATM cell header value of the VC connection within the device, in which the CPS-packet is multiplexed and packed.

The CPS-packet header conversion table 1351 is constituted by a combination of (H2, h) for registering the CPS-packet header value h within the device and (H3, CID) for registering the CPS-packet header value on the transfer path. The CPS-packet header conversion section 1353 accesses the CPS-packet header conversion table using (H2, h) as a retrieve key to obtain (H3, CID), and converts the CPS-packet header to CID, thus transferring the CPS-packet to the CPS-packet distribution section 1354. The CPS distribution section 1354 decides the VC connection in which the CPS-packet is multiplexed and packed, by the H3 value which is transferred via the area 1371 of (H2, h) simultaneously. Then, the CPS distribution section 1354 transfers the CPS-packet to the ATM cell assembling buffer 1355. In the ATM cell assembling buffer 1355, the CPS-packets sequentially stored are multiplexed and packed in the buffers 1361 to 1364 of H3 unit, thus assembling the ATM cell. In the ATM cell multiplexing section 1356, the ATM cell which was assembled in the buffers 1361 to 1364 is multiplexed, and transferred to the ATM cell transmission section 312.

Reading-out of the ATM cell from the ATM cell multiplexing section 1356 is controlled by the ATM cell reading-out control section 1359. In the case where the CPS-packet is multiplexed and packed in the ATM cell and the ATM cell is sent out on the transfer path, the method of the foregoing timer monitor of queue unit is generally used. In this case, other foregoing algorithms may be properly used.

The ATM cell transmission section 312 comprises an ATM cell header conversion section 1252 and an ATM cell header conversion table 1251. The ATM cell header conversion section 1252 extracts H3 from the ATM cell header inputted thereto, accesses the ATM cell header conversion table 1252, and retrieves VPI/VCI loaded on the ATM cell on the transfer path. After the ATM cell header conversion table 1251 registers the cell header value H3 loaded on the ATM cell within the device, the ATM cell header conversion table 1251 stores the cell header value H3 while allowing it to correspond to (VPI, VCI) for loading the VPI/VCI on the transfer path. The ATM header conversion section 1252 accesses the ATM cell header conversion table 1251 using the extracted H3 from the ATM cell header as a retrieve key, and obtains VPI/VCI on the transfer path to present it to the ATM cell header.

As described above, processing for the ATM cell and the CPS-packet are executed.

Figure 8:
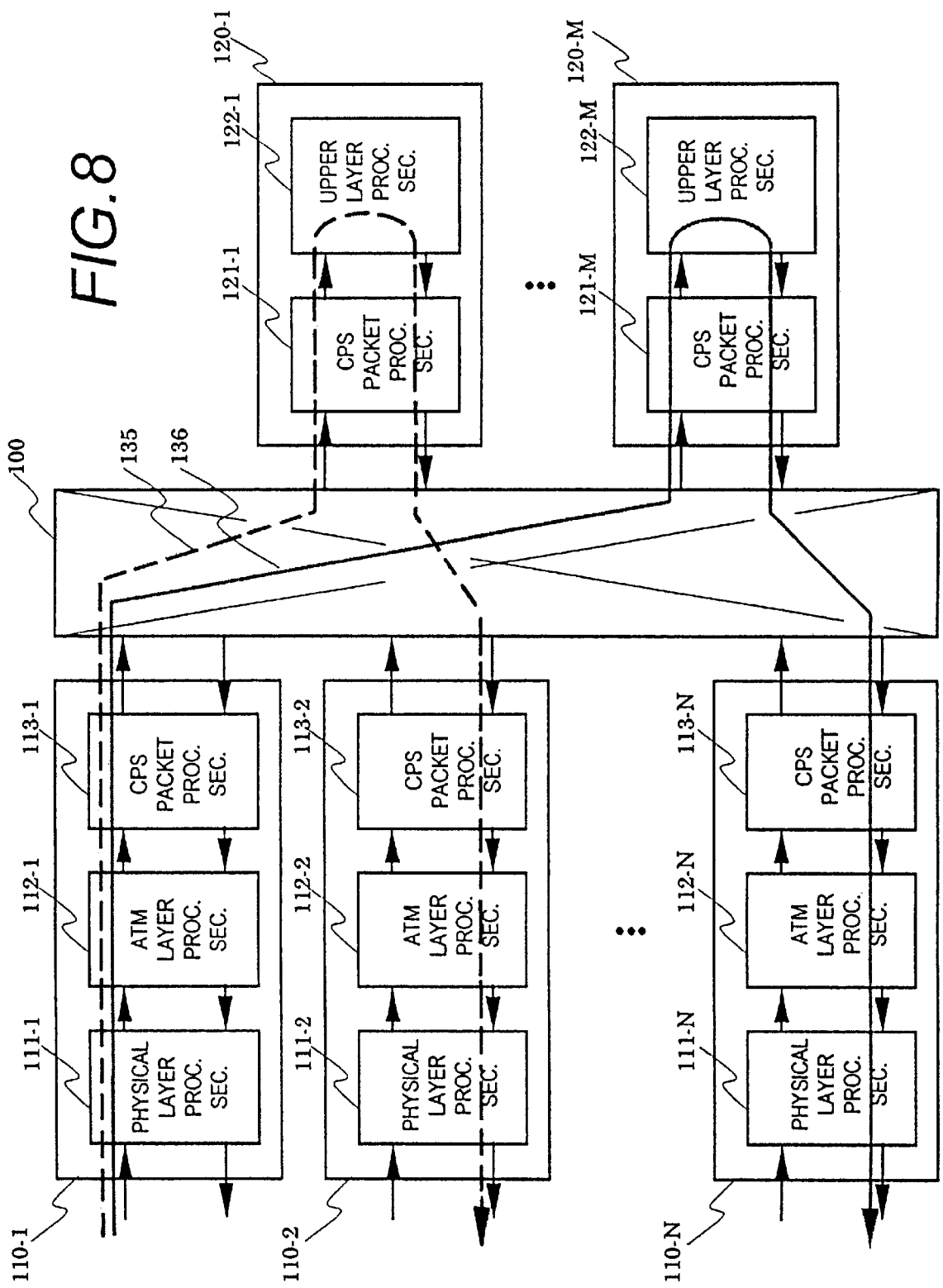
FIG. 8 is a block diagram of a second embodiment of a variable length packet switch according to the present invention.

FIG. 8 is a block diagram of a second embodiment of the variable length packet switch according to the present invention. The variable length packet switch of the second embodiment shown in FIG. 8 has a constitution that upper layer processing functioning section 120-1 to 120-M for processing a signal loaded on the payload of the CPS-packet are added to the switch of FIG. 1, which exchanges the CPS-packet. The upper layer processing functioning section 120-1 to 120-M comprises a CPS-packet processing section 121-1 to 121-M for performing demultiplexing/unpacking and multiplexing/packing for the CPS-packet, and an upper layer processing section 122-1 to 122-M for processing a signal of the CPS-packet payload. In this embodiment, information loaded on the payload of the CPS-packet to be inputted to any one of the interface sections 110-1 to 110-N is processed, and the CPS-packet is again generated, so that the CPS-packet can be outputted to any one of the interface sections 110-1 to 110N. For example, conversion of the encoding system for a voice signal, which is loaded on the CPS-packet, encryption and decryption, compression and extension, protocol conversion, media conversion various kinds of service processings or the like are objects.

In FIG. 8, the paths 135 and 136 show an example of a transfer path of the CPS-packet, which is within the device. After the same processing as that of the first embodiment is performed in the interface section 110-1, the path 135 is connected to the upper layer processing functioning section 120-1 through the switching section 100. In the CPS-packet processing section 121-1, the CPS-packet is separated from the ATM cell, and the upper layer processing section 122-1 performs the processing for the CPS-packet payload. Then, the CPS-packet processing section 121-1 multiplexes and packs the CPS-packet in the ATM cell, and transfers the ATM cell to the interface section 110-2 via the switching section 100. In the interface section 110-2, the same processing as that of the first embodiment is performed, and the ATM cell is outputted on the transmission path. The path 136 illustrates an example in which the CPS-packet is processed in the order of the interface section 110-1, the switching section 100, the high order processing functioning section 120-M and the interface section 110-M.

Figure 9:
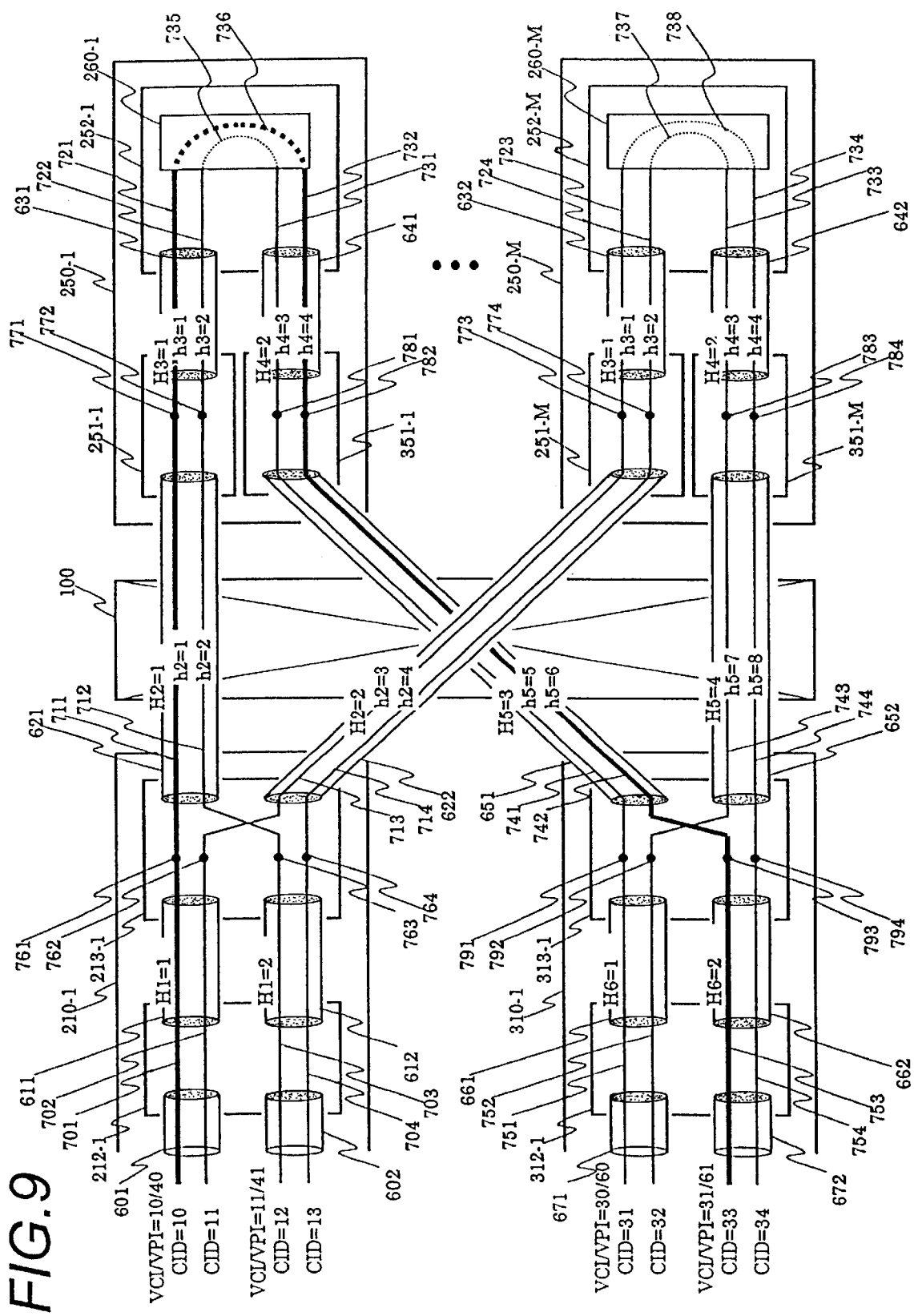
FIG. 9 is a view showing an example of a connection setting state in a device in the second embodiment.

FIG. 9 shows an example of a setting state of the connections within the device of the second embodiment. As compared with FIG. 8 and FIG. 9, with regard to the interface section 110-1, the input side 210-1 and the output side 310-1 are expressed similarly to the first embodiment. The block 250-1 to 250-M shows the upper layer functioning section 121-1 to 121-M, and the CPS-packet transmission section 251-1 to 251-M, the CPS-packet receiving section 351-1 to 351-M, the upper layer processing section 252-1 to 252-M, and CPS-packet payload processing section 260-1 to 260-M are shown therein.

In FIG. 9, illustrated is an example, in which the four connections 701, 702, 703 and 704 designated by the (VPI, VCI, CID)=(10, 40, 10), (10, 40, 11), (11, 41, 12) and (11, 41, 13) are set for the input side 210-1 of the interface section, and the four connections 751, 752, 753 and 754 designated by the (VPI, VCI, CID)=(30, 60, 31), (30, 60, 32), (31, 61, 33) and (31, 61, 34) are set for the output side 310-1 of the interface section.

As an example, shown is a constitution in which the connection 701 set on the input side 210-1 of the interface section is connected to the connection 753 set on the output side 310-1 of the interface section. Operations of the input side 210-1 of the interface section, the switching section 100, and the output side 310-1 of the interface section are the same as those of the first embodiment. The VC connection 601 in which the connection 701 designated by the (VPI, VCI, CID)=(10, 40, 10) is multiplexed and packed is converted to the connection 611 within the device, which is designated by H1=1 from (VPI, VCI)=(10, 40). Thus, in the CPS-packet receiving section 213-1, the connection 701 is designated by (H1, CID)=(1, 10), and, in the CPS-packet header conversion point 761, the connection 701 is converted to the connection 711 designated by (H2, h2)=(1, 1), and connected to the upper layer functioning section 250-1 through the switching section 100.

In the CPS-packet transmission section 251-1 of the upper layer functioning section 250-1, the connection 711 within the device, which is designated by (H2, h2)=(1, 1) is converted to the connection 721 within the device, which is designated by (H3, h3)=(1, 1) in the CPS-packet header conversion point 771, and the connection 721 is connected to the CPS-packet payload processing section 260-1 of the upper layer processing section 252-1. In the CPS-packet payload processing system 260-1, the CPS-packet payload is processed, and the connection 721 is connected to the CPS-packet receiving section 351-1 via the connection 736 as the connection 732 within the device, which is designated by (H4, h4)=(2, 4). The CPS-packet receiving section 351-1 converts the connection 732 within the device, which is designated by (H4, h4)=(2, 4), to the connection 742 within the device, which is designated by (H5, h5)=(3, 6 ), in the CPS-packet header conversion point 782, and connects the connection 742 to the transmission side 310-1 of the interface section through the switching section 100.

In the CPS-packet header conversion point 793, the CPS-packet transmission section 313-1 on the transmission side 310-1 of the interface section converts the connection 742 within the device, which is designated by (H5, h5)=(3, 6), to the connection 753 designated by (H6, CID)=(2, 33), and connects the connection 753 to the ATM cell transmission section 312-1. The ATM cell transmission section 312-1 converts the VC connection 662 within the device, which is designated by H6=2, to the VC connection 672 designated by (VCI, VPI)=(31, 61). The connection 753 is multiplexed and packed in the VC connection 662.

Similarly, with regard to any of connections set in the interface sections 110-1 to 110-N, a CPS-packet payload processing is performed, and the ATM cell can be outputted to any of connections set in the interface section 110-N. In the manner described above, the second embodiment in which the processing of the CPS-packet by the payload section is additionally performed compared to the first embodiment can be realized.

Figure 10:
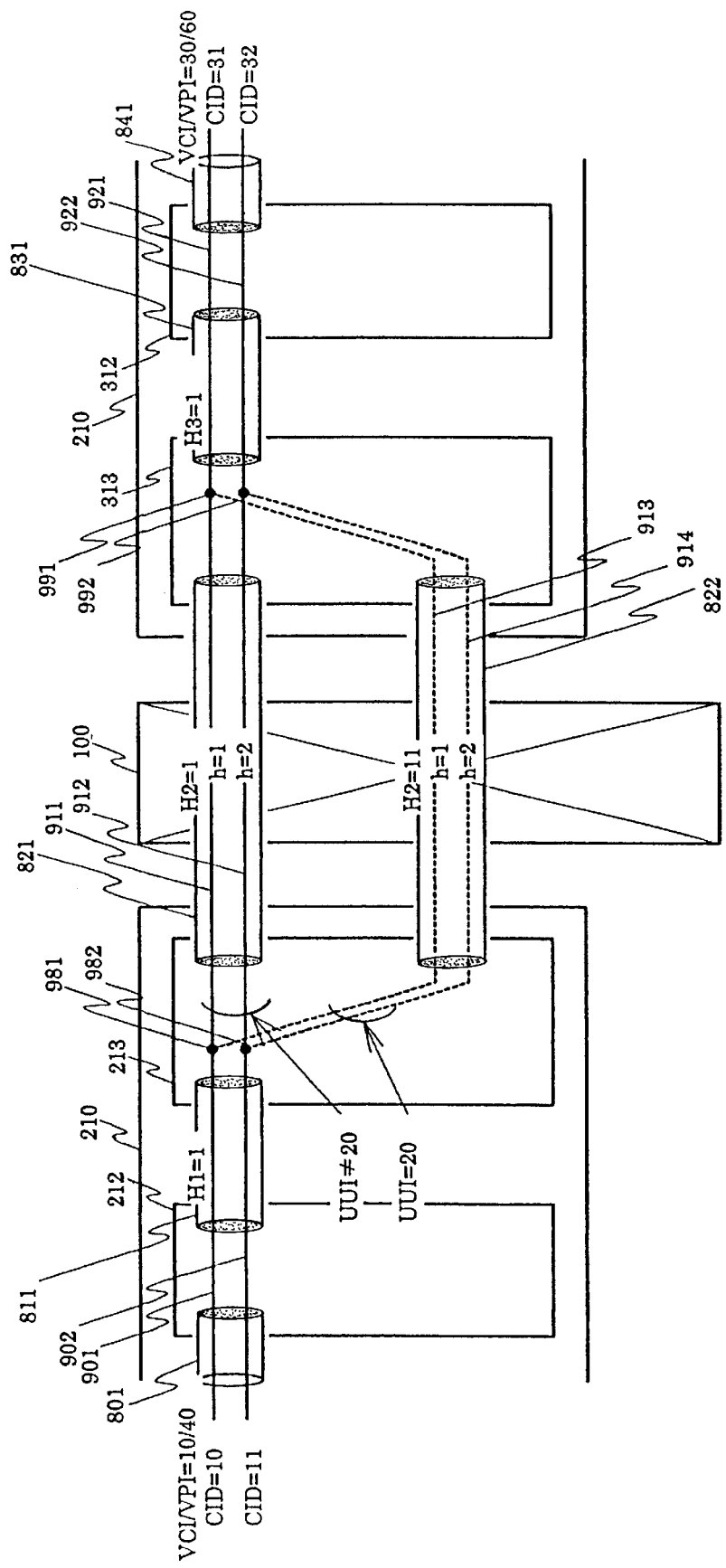
FIG. 10 is a block diagram of a third embodiment of a variable length packet switch according to the present invention.

FIG. 10 is a view showing a constitution of a third embodiment of a variable length packet switch according to the present invention. Compared to FIG. 10 with FIG. 1, the input side 210 and the output side 310 are shown in the interface section 110-1 to 110-N. The input side 210 of the interface section 110-1 to 110-N comprises the ATM cell receiving section 212 and the CPS-packet receiving section 213, and the output side 310 of the interface section 110-1 to 110-N comprises the ATM cell transmission section 312 and the CPS-packet transmission section 313. The switching section 100 is provided between the input side 210 of the interface section 110-1 to 110-N and the output side 310 thereof In the first embodiment, when the output side 310 of the interface section to which a plurality of connections set on the input side 210 of the interface section are to be connected is identical, the plurality of connections are multiplexed and packed in a single VC connection within the device, thus allowing it to pass through the switching section 100. On the other hand, the third embodiment has a feature in that depending on a feature of the CPS-packet to be transferred through the switching section 100, the VC connection in which the CPS-packet is to be multiplexed and packed is changed, thus allowing it to pass through the switching section 100. Thus, it is possible to control an interference between CPS-packets having different natures.

FIG. 10 is a view showing a constitution in which the VC connection within the device to be connected through the switching section 100 is changed, for example, depending on a difference of a value of an area called UUI that is a part of the CPS-packet header. Hereupon, although the UUI is, for example, used, a VC connection within the device, which is connected through the switching section 100, may also be decided depending on other areas and data such as CID and LI. In FIG. 10, the connections 901 and 902 designated by (VPI, VCI, CID)=(10, 40, 10) and (10, 40, 11) are set on the input side 210 of the interface section, and the connections 921 and 922 designated by (VPI, VCI, CID)=(30, 60, 31) and (30, 60, 32) are set on the input side 310 of the interface section. Moreover, as an example, a quality of the CPS-packet to be required shall differ between the case of UUI=20 and cases other than UUI=20.

The connection 901 designated by (VCI, VPI, CID)=(10, 40, 10) will be hereinafter described as an example. In the ATM cell receiving section 212, the VC connection 801 designated by (VPI, VCI)=(10, 40) is converted to the VC connection within the device, which is designated by H1. Thus, the connection 901 is designated as (H1, CID)=(1, 10) in the CPS-packet receiving section 213, and converted to a connection within the device, which is designated by (H2, h), in the CPS-packet header conversion point 981. At this time, a UUI area of the CPS-packet header is identified, and the VC connections 821 and 822 within the device, which have been multiplexed and packed, are distinguished from each other. When the UUI area is other than 20, multiplexing/packing in the VC connection 821 of H2=1 within the device is performed, and a conversion to the connection 911 within the device, which is designated by (H2, h)=(2, 1), is performed. When the UUI area is 20, multiplexing/packing in the VC connection 822 within the device, which is designated by H2=1, is performed, and a conversion to the connection 913 within the device, which is designated by (H2, h)=(11, 1), is performed. The CPS-packet receiving section 313 for receiving the CPS-packet converts the connection 911 within the device, which is designated by (H2, h)=(1, 1), and the connection 913 within the device, which is designated by (H2, h)=(11, 1), to the connection 921 designated by (H3, CID)=(1, 31) in the CPS-packet header conversion point 991. Hereupon, it is emphasized that the connections 911 and 913 within the device are converted to the same connection 921. Moreover, in the ATM cell transmission section 312, the VC connection 831 within the device, which is designated by H3=1, is converted to the VC connection 841 designated by (VPI, VCI)=(30, 60). Thus, after control by the UUI value, the connection 901 designated by (VPI, VCI, CID)=(10, 40, 10) is connected to the connection 921 designated by (VPI, VCI, CID)=(30, 60, 32).

FIG. 11 shows an explanatory view of the CPS-packet header conversion table 1401 used in the CPS-packet receiving section 213. FIG. 12 shows an explanatory view of the CPS-packet header conversion table 1451 used in the CPS-packet transmission section 313. For example, these tables can be realized by changing the CPS-packet header conversion tables 1301 and 1351 shown in FIGS. 6 and 7, in order to use them in the third embodiment. In the CPS-packet receiving section 213, from the received CPS-packet header and the ATM cell header of the VC connection 811within the device, in which this CPS-packet header is multiplexed and packed, the CPS-packet conversion table 1401 is accessed using (H1, CID, UUI) as a retrieve key, and (H2, h) is obtained. In the foregoing example, the register area 1421 of (H1, CID, UUI)=(1, 10, ≠20) is retrieved, and (H2, h)=(1, 1) is obtained from the register area 1431 of (H2, h), which corresponds to the area 1421. The register area 1422 of (H1, CID, UUI)=(1, 10, 20) is retrieved, and (H2, h)=(11, 1) from the register area 1432 of (H2, h), which corresponds to the area 1422. By this value, conversion of the CPS-packet header is performed, and a VC connection within the device, which is multiplexed and packed, is designated. A constitution of the CPS-packet receiving section 213 is identical to that in which the CPS-packet header conversion table 1301 in FIG. 4 is replaced with the CPS-packet header conversion table 1401.

A constitution of the CPS-packet transmission section 313 is the same as that of FIG. 5. A constitution and operation of the CPS-packet header conversion table 1451 are similar to those of the CPS-packet header conversion table 1351, though contents stored in both tables 1351 and 1451 are different from each other. In the CPS-packet transmission section 313, the CPS-packet header conversion table 1451 is accessed using (H2, h) as a retrieve key, and (H3, CID) is obtained. In the foregoing example, the register area 1471 designated by (H2, h)=(1, 1) is retrieved, and (H3, CID)=(1, 31) is obtained from the register area 1481 of (H3, CID) which corresponds to the area 1471. On the other hand, the register area 1473 designated by (H2, h)=(11, 1) is retrieved, and (H3, CID)=(1, 31) is obtained from the register area 1483 of (H3, CID), which corresponds to the area 1473. Thus, a conversion of the CPS-packet header and a VC connection within the device, which is multiplexed and packed, is designated.

Figure 13:
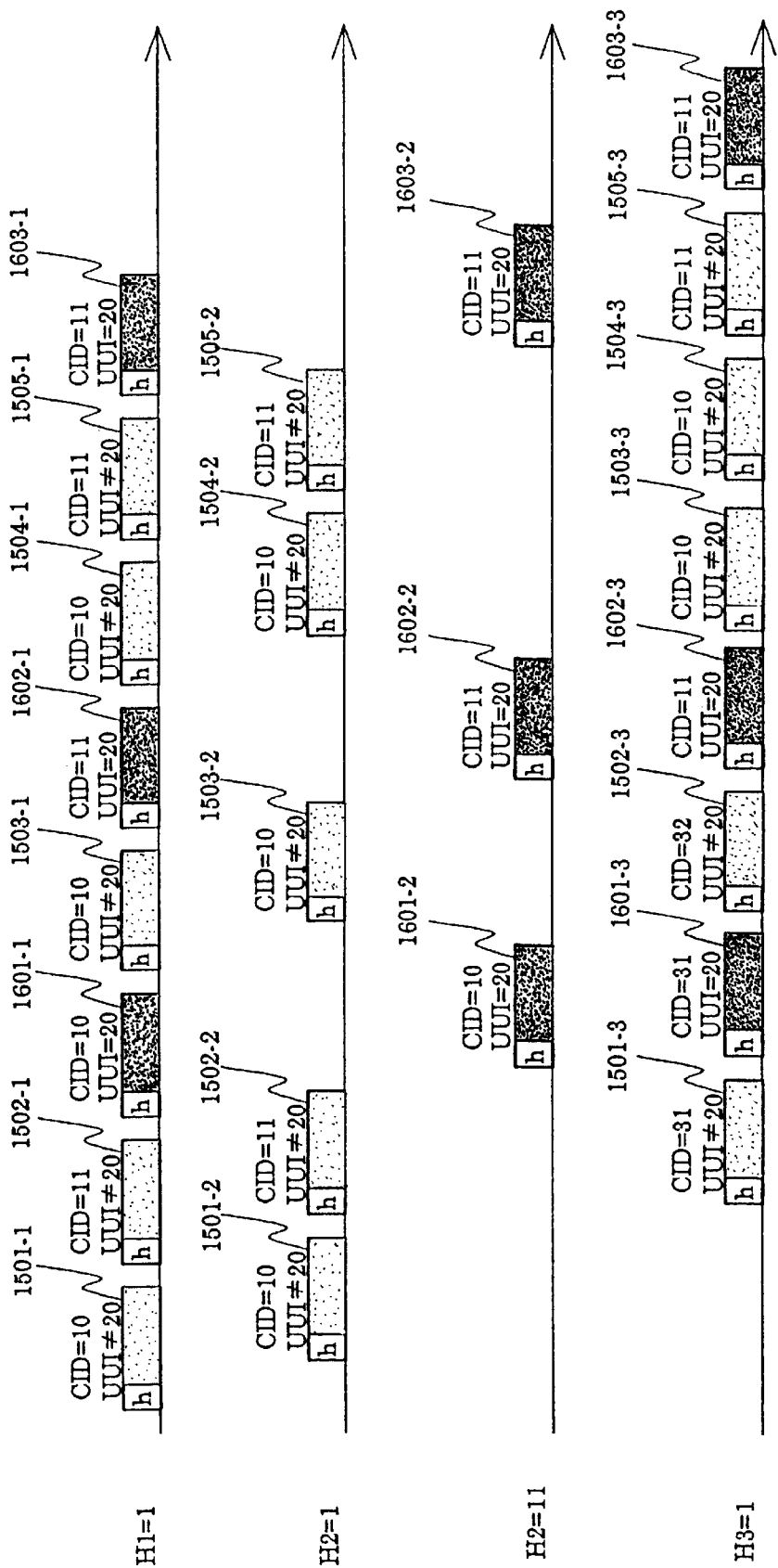
FIG. 13 is an explanatory view showing a flow of a CPS-packet transferred in the third embodiment.
Figure 14:
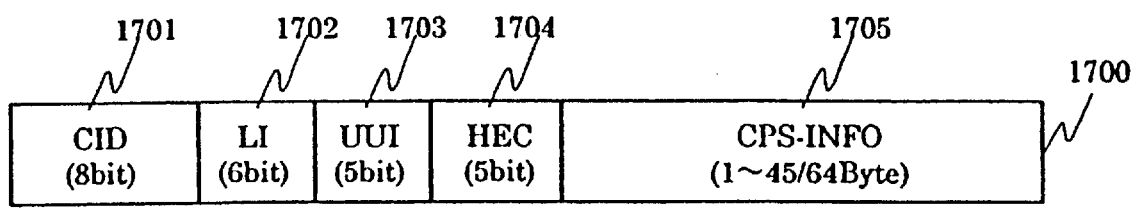
FIG. 14 is a format of the CPS-packet.

FIG. 13 shows an explanatory view showing a flow of the CPS-packet which is transferred in the third embodiment. The CPS-packets 1501-1, 1502-1, 1503-1, 1504-1 and 1505-1 show the CPS-packet of UID≠20, and the CPS-packets 1601-1, 1602-1 and 1603-1 show the CPS-packet of UID=20. Furthermore, these are multiplexed and packed in the VC connection 811 with the device, which is designated by H1=1. When the ATM cell passes through the switching section 100, the CPS-packets 1501-1, 1502-2, 1503-2, 15042 and 1505-2 of UUI≠20 are multiplexed and packed in the VC connection 821 within the device, which is designated by H2=1. The CPS-packets 1601-2, 1602-2 and 1603-2 of UUI=20 are multiplexed and packed in the VC connection 822 within the device, which is designated by H2=11. The foregoing CPS-packets 1501-3, 1502-3, 1503-3, 15043, 1505-3, 1601-3, 1602-3 and 1603-3 are finally multiplexed and packed in the VC connection 831, within the device, which is designated by H3=1. At this time, although an order relation between the CPS-packets of UUI=20 and the CPS-packets UUI≠20 may be reversed, it is emphasized that paying attention to only the CPS-packets 1601-3, 1602-3 and 1603-3 of UUI=20 or only the CPS-packets 1501-3, 1502-3, 1503-3, 1504-3 and 1505-3 of UUI≠20, the order relation is reserved. If in the switching section 100, the ATM cell designated by H2=1 lacks, this has no effect on the CPS-packet of UUI=20 transferred by the VC connection 822, which is designated by H2=11.

The VC connection within the device, which is designated by H2=1 and the VC connection within the device, which is designated by H2=11, differ from each other in their a storage unit (logical queue) in the ATM cell assembling buffer 1305 of FIG. 4. Specifically, this shows that it is possible to control them individually at the time when they are transferred to the switching section 100. If this fact is utilized, it is possible to control the qualities of the VC connections 821 and 822 within the device individually, by controlling reading-out by the ATM cell multiplexing section 1306. Moreover, paying attention to the connections 911 and 913 within the device, which are on the VC connections 821 and 822 within the device, it is no more than controlling of the quality at the time when the CPS-packet passes through the switching section 100 by the UUI value in spite of the fact that the input is the connection 901. As long as the quality of the CPS-packet is determined by the UUI value, it is possible to control the quality of the CPS-packet by the UUI value. Moreover, even when the required quality depending on sorts of transfer data such as voices, images and data is different, a proper connection can be selected depending on the required quality.

It should be noted that the foregoing first to third embodiments can be properly combined.

Although the preferred embodiments of the present invention have been described in detail, it should be understood that various changes, substitutions and alternations can be made therein without departing from spirit and scope of the inventions ad defined by the appended claims.

What is claimed is:

1. A variable length packet switch which exchanges a plurality of variable length packets loaded on a cell to be transferred in an asynchronous transfer mode, comprising:

a receiving interface section for receiving a cell;

a transmission interface section for transmitting the cell; and a switching section for exchanging the cell, said switching section to which said receiving and transmitting interface sections are connected, wherein said receiving interface section includes a variable length packet receiving section which disassembles the received cell to demultiplex and unpack the variable length packets multiplexed and packed in the received cell and multiplexes and packs the variable length packets in a cell having the same header value, the variable length packets being transferred to the same transfer interface section where a transmission processing is performed, thereby allowing the variable length packets to pass through said switching section, said switching section transfers the cell transferred from said receiving interface section to said transmission interface section where a transmission processing is performed in accordance with a header value of the cell, and said transmission interface section includes a variable length packet transmission section which disassembles the cell transferred from said switching section, demultiplexes and unpacks the variable length packets multiplexed and packed, and multiplexes and packs the variable length packets to be outputted in the same output path in a transmission cell having the same header value.

2. The variable length packet switch according to clam 1, wherein said variable length packet receiving section includes:

a first cell disassembling section for disassembling the received cell to demultiplex and unpack the variable length packet from the received cell;

a first variable packet header conversion section for converting a header of the variable length packet demultiplexed and unpacked by said first cell disassembling section;

a first variable length packet distribution section for distributing the variable length packet to each of said transmission interface sections where a transmission processing for the variable length packet is performed, based on the converted header by said first variable length packet header conversion section;

a first cell assembling section for multiplexing and packing, in the same connection, the variable length packet distributed by said first variable length packet distribution section; and a first cell multiplexing section for outputting a cell assembled by said first cell assembling section to said switching section.

3. The variable length packet switch according to claim 2, wherein said variable length packet receiving section further includes:

a first packet header conversion table which has a receiving packet header register area for registering a set of a header value of a received cell within a device and a header value of the separated variable length packet, and a multiplexing/packing packet header register area for registering a set of a header value of a cell within the device, in which the separated variable length packet is multiplexed and packed, and a header value of the variable length packet which has been subjected to a header value conversion, the first packet header conversion table storing said receiving packet header register area and said multiplexing/packing packet header register area while allowing both areas to correspond to each other, and said first variable length packet header conversion section retrieves a value registered in the receiving packet header register area of said first packet header conversion table based on the set of the header value of the received cell within the device and the header value of the separated variable length packet, and obtains a header value of a cell in which the separated variable length packet is multiplexed and packed as well as a header value of a variable length packet which has been subjected to a header value conversion from a value of the corresponding multiplexing/packing packed header register area.

4. The variable length packet switch according to claim 3, wherein said first variable length packet distribution section distributes the variable length packet by a value of a multiplexing/packing packet header register area which is retrieved by said first variable length packet header conversion section and registered in said first packet conversion table.

5. The variable length packet switch according to claim 3, wherein said first cell assembling section includes a plurality of first cellularized buffer sections which are provided for each of said transmission interface sections, in order to accumulate the demultiplexed and unpacked variable length packet and to assemble the cell, and any of said first cellularized buffer sections for accumulating the separated variable length packet is selected by a value of the multiplexing/packing packet header register area registered in said first packet header conversion table.

6. The variable length packet switch according to claim 2, wherein said variable length packet receiving section further includes a cell header conversion section for converting a header value of a cell on a transmission path with a header value of a cell within a device.

7. The variable length packet switch according to claim 1, wherein said variable length packet transmission section includes;

a second cell disassembling section for disassembling a cell transferred from said switching section and for demultiplexing and unpacking the variable length packet;

a second variable length packet header conversion section for converting a packet header of the demultiplexed and unpacked variable length packet;

a second variable length packet distribution section for distributing the variable length packet for each transmission cell which corresponds to an output path;

a second cell assembling section for multiplexing and packing the variable length packet in the same connection, the variable length packet having been distributed by said second variable length packet distribution section; and a second cell multiplexing section for sending out an assembled cell.

8. The variable length packet switch according to claim 7, wherein said variable length packet transmission section further comprises:

a second packet header conversion table which includes a multiplexing/packing packet header register area for registering a set of a header value of a cell within a device, in which a received variable length packet is multiplexed and packed, and a header value of a variable length packet within the device, and a transmission packet header register area for registering a set of a header value of a cell within the device, which has been subjected to a header value conversion, and a header value of a variable length packet on a transfer path, the second packet header conversion table storing said multiplexing/packing packet header register area and said transmission packet header register area while allowing both areas to correspond to each other, and wherein based on the set of the header value of the cell within the device, in which the received variable length packet is multiplexed and packed, and the header value of the variable length packet within the device, said second variable length packet header conversion section retrieves a value registered in the transmission packet header register area of said second packet header conversion table, and obtains the header value of the cell within the device, which has been subjected to a header value conversion, and the header value of the variable length packet on the transmission path, from a value of the multiplexing/packing packet header register area corresponding to the transmission packet header register area.

9. The variable length packet switch according to claim 8, wherein said second variable length packet distribution section distributes the variable length packet by a value of the multiplexing/packing packet header register area, which is retrieved by said second variable length packet header conversion section and registered in said second packet header conversion table.

10. The variable length packet switch according to claim 8, wherein said second cell assembling section includes a plurality of second cellularized buffer sections which are provided for each of output paths, in order to accumulate the demultiplexed and unpacked variable length packet and to assemble the cell, and any of said second cellularized buffer sections for accumulating the demultiplexed and unpacked variable length packet is selected by a value of the multiplexing/ packing packet header register area registered in said second packet header conversion table.

11. The variable length packet switch according to claim 7, wherein said variable length packet transmission section further comprises a cell header conversion section for converting a header value of a cell on a transmission path with a header value within the device.

12. The variable length packet switch according to claim 1, wherein said receiving interface section further identifies a sort of the variable length packet having the same transmission interface section where a transmission processing is performed, and multiplexes and packs the variable length packet in a cell having a different header value depending on the sort thereof thereby transferring the cell to said switching section.

13. The variable length packet switch according to claim 12, wherein said receiving interface section includes:
- a third packet header conversion table which has a receiving packet header register area for registering a set of a header value of a received cell within a device, a header value of the separated variable length packet and a value of a sort of the received packet, and a multiplexing/packing packet header register area for registering a set of a header value of a cell within the device, in which the separated variable length packet is multiplexed and packed, and a header value of the variable length packet which has been subjected to a header value conversion, the third packet header conversion table storing said receiving packet header register area and said multiplexing/packing packet header register area while allowing both areas to correspond to each other, and
- wherein based on the set of the header value of the received cell within the device, the header value of the separated variable length packet and the value of the sort of the received packet, a value registered in the receiving packet header register area of said third packet header conversion table is retrieved, and a header value within the device of a cell in which the separated variable length packet is multiplexed and packed as well as a header value of a variable length packet which has been subjected to a header value conversion are obtained from a value of the corresponding multiplexing/packing packet header register area.

14. The variable length packet switch according to claim 1, said variable length packet switch further comprising:
- an upper layer functioning section connected to the switching section, wherein said receiving interface section disassembles a received cell, demultiplexes and unpacks the variable length packet multiplexed and packed in the received cell, and multiplexes and packs the variable length packets, which are to be subjected to a transmission processing by the same upper layer functioning section, in a cell of the same header value, thereby transferring the cell to said upper layer functioning section.

* * * * *